US008657358B2

(12) United States Patent
Garska (10) Patent No.: US 8,657,358 B2
(45) Date of Patent: Feb. 25, 2014

(54) PICKUP TRUCK BED TONNEAU COVER SUPPORT STRUCTURE AND METHOD

(75) Inventor: Bradley R. Garska, Saline, MI (US)

(73) Assignee: Specialty Vehicle Acquisition Corporation, Warren, MI (US)

( * ) Notice: Subject to any disclaimer, the term of this patent is extended or adjusted under 35 U.S.C. 154(b) by 0 days.

(21) Appl. No.: 13/538,261

(22) Filed: Jun. 29, 2012

(65) Prior Publication Data

US 2013/0341955 A1 Dec. 26, 2013

Related U.S. Application Data (60) Provisional application No. 61/663,298, filed on Jun. 22, 2012.

(51) Int. Cl.
*B60P 7/02* (2006.01)

(52) U.S. Cl.
USPC .............................. 296/100.09; 296/100.18

(58) Field of Classification Search
USPC ............ 296/100.06, 100.09, 100.15, 100.17, 296/100.18
See application file for complete search history.

(56) References Cited

U.S. PATENT DOCUMENTS

| 4,221,423 A | 9/1980 | Stone |
| 4,747,441 A | 5/1988 | Apolzer et al. |
| 5,263,761 A * | 11/1993 | Hathaway et al. ....... 296/100.18 |
| 5,427,428 A | 6/1995 | Ericson et al. |
| 5,636,893 A | 6/1997 | Wheatley et al. |
| 6,752,449 B1 | 6/2004 | Wheatley |
| 6,808,221 B2 | 10/2004 | Wheatley |
| 6,893,073 B2 | 5/2005 | Wheatley |
| 6,948,760 B2 | 9/2005 | Marx et al. |
| 7,004,530 B2 | 2/2006 | Marx et al. |
| 7,021,693 B2 | 4/2006 | Keller |
| 7,051,781 B2 | 5/2006 | Grimm et al. |
| 7,066,523 B2 | 6/2006 | Verduci et al. |
| 7,114,769 B2 | 10/2006 | Storc et al. |
| 7,163,260 B2 | 1/2007 | Reitzloff et al. |
| 7,188,888 B2 | 3/2007 | Wheatley et al. |
| 7,303,227 B2 | 12/2007 | Reitzloff et al. |
| 7,334,830 B2 | 2/2008 | Weldy |
| 7,399,030 B2 | 7/2008 | Reitzloff et al. |
| RE41,078 E | 1/2010 | Schmeichel |
| 7,938,483 B2 | 5/2011 | Reitzloff et al. |
| 8,061,758 B2 | 11/2011 | Maimin et al. |
| 2008/0129077 A1 | 6/2008 | Weldy |

\* cited by examiner

*Primary Examiner* — Joseph Pape
(74) *Attorney, Agent, or Firm* — Harness, Dickey & Pierce, P.L.C.

(57) ABSTRACT

An outer frame corresponds to a perimeter of a pickup truck bed. An plurality of upwardly bowed intermediate rail span between, and are coupled to, opposing sides of the outer frame. Each bowed intermediate rail is paired with a wire tension member that spans between, and is coupled to, each end of its paired intermediate rail member. A flexible textile member covers and is supported by the intermediate rail member and is coupled to the outer frame. The wire tension members operate to help reduce lateral deflection of the bowed intermediate rail members when a meaningful downward force is applied to the bowed intermediate rails. A method of assembling a tonneau cover is also disclosed.

20 Claims, 6 Drawing Sheets

PICKUP TRUCK BED TONNEAU COVER SUPPORT STRUCTURE AND METHOD

CROSS-REFERENCE TO RELATED APPLICATIONS

This application claims the benefit of U.S. Provisional Application No. 61/663,298, filed on Jun. 22, 2012. The entire disclosure of the above application is incorporated herein by reference.

BACKGROUND AND SUMMARY

The present disclosure relates to pickup truck bed tonneau covers, and more particularly to support structures for such tonneau covers with flexible textile coverings.

This section provides background information related to the present disclosure which is not necessarily prior art. This section also provides a general summary of the disclosure, and is not a comprehensive disclosure of its full scope or all of its features, nor are the features summarized herein essential aspects of the disclosure.

Pickup truck tonneau covers can include an outer frame with several intermediate cross-car rails spanning between opposing sides of the outer rail. These intermediate rails span the cross-car width of the pickup truck bed and are unsupported, except at their ends. A flexible fabric cover can be supported by and coupled to this frame and intermediate rail supporting structure.

Pickup truck tonneau covers can be subjected to considerable downward forces in use. For example, snow can potentially generate snow loads on the tonneau cover of 15.6 pounds per square foot. This can impart considerable forces to the supporting structure, including the intermediate cross-car rails. To meet these loads, high strength materials and large cross sections are typically used for these intermediate cross-car rails. Unfortunately, both of these solutions tend to increase the weight and costs of the tonneau cover, which is undesirable.

A reduction in weight and cost can be accomplished by providing a supporting intermediate cross-car structure that permits the use of lower strength materials and smaller cross-sections (less material), while still adequately managing the loads encountered without undue displacement.

In one aspect of the present disclosure a pickup truck bed tonneau cover includes an outer frame comprising a front frame member, a rear frame member, a side frame member and an opposing side frame member. The outer frame is configured to substantially correspond to a perimeter of the pickup truck bed. A pair of intermediate rail brackets is coupled to opposing sides of the outer frame so that a first of the pair of intermediate rail brackets is coupled to one side frame member and a second of the pair of intermediate rail brackets is coupled to an opposing side frame member. An intermediate rail member spans between, and is coupled to, the pair of intermediate rail brackets so that each end of the intermediate rail member is coupled to one of the pair of intermediate rail brackets, the intermediate rail member is bowed upwardly along an elongated length of the intermediate rail member. A wire tension member spans between each end of the intermediate rail member, the wire tension member is coupled to each end of the intermediate rail member. A flexible textile member covers and is supported by the intermediate rail member and is coupled to the outer frame.

Another aspect of the present disclosure is a method of manufacturing a pickup truck bed tonneau cover. The method includes providing a generally rectangular outer frame with a configuration that substantially corresponds to a pickup truck bed perimeter. A plurality of elongated intermediate rails are formed to have an upwardly bowed shape along a length of each bowed intermediate rail. A first end of each bowed intermediate rail is coupled to one side of the outer frame and an opposing end of each bowed intermediate rail is coupled to an opposing side of the outer frame. A first end of a wire tension member is coupled to the first end of each bowed intermediate rail and an opposing end of the wire tension member is coupled to the opposing end of each bowed intermediate rail. A flexible textile member is positioned over the outer frame and bowed intermediate rails and coupled to the outer frame.

Further areas of applicability will become apparent from the description provided herein. The description and specific examples in this summary and in the following description are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 4:
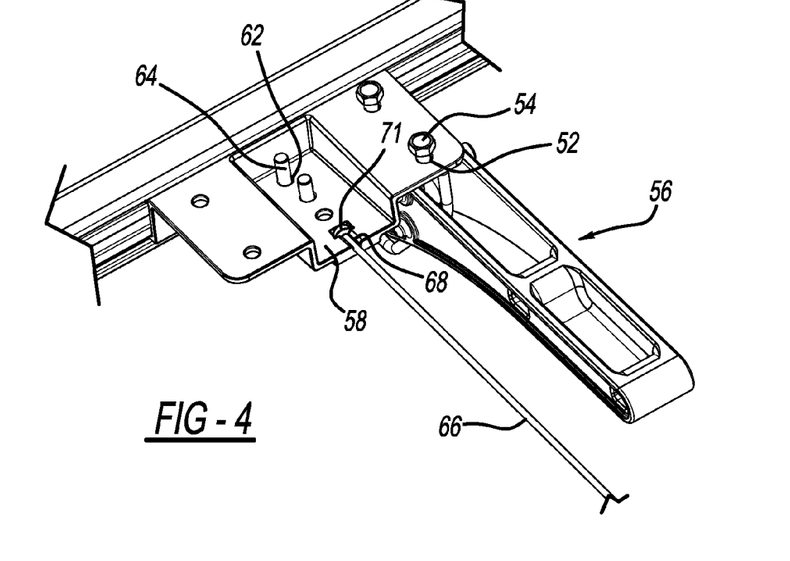
FIG. 4 is an enlarged partial perspective similar to FIG. 3 but viewing the lower side of a cross bar bracket and side rail member.
Figure 5:
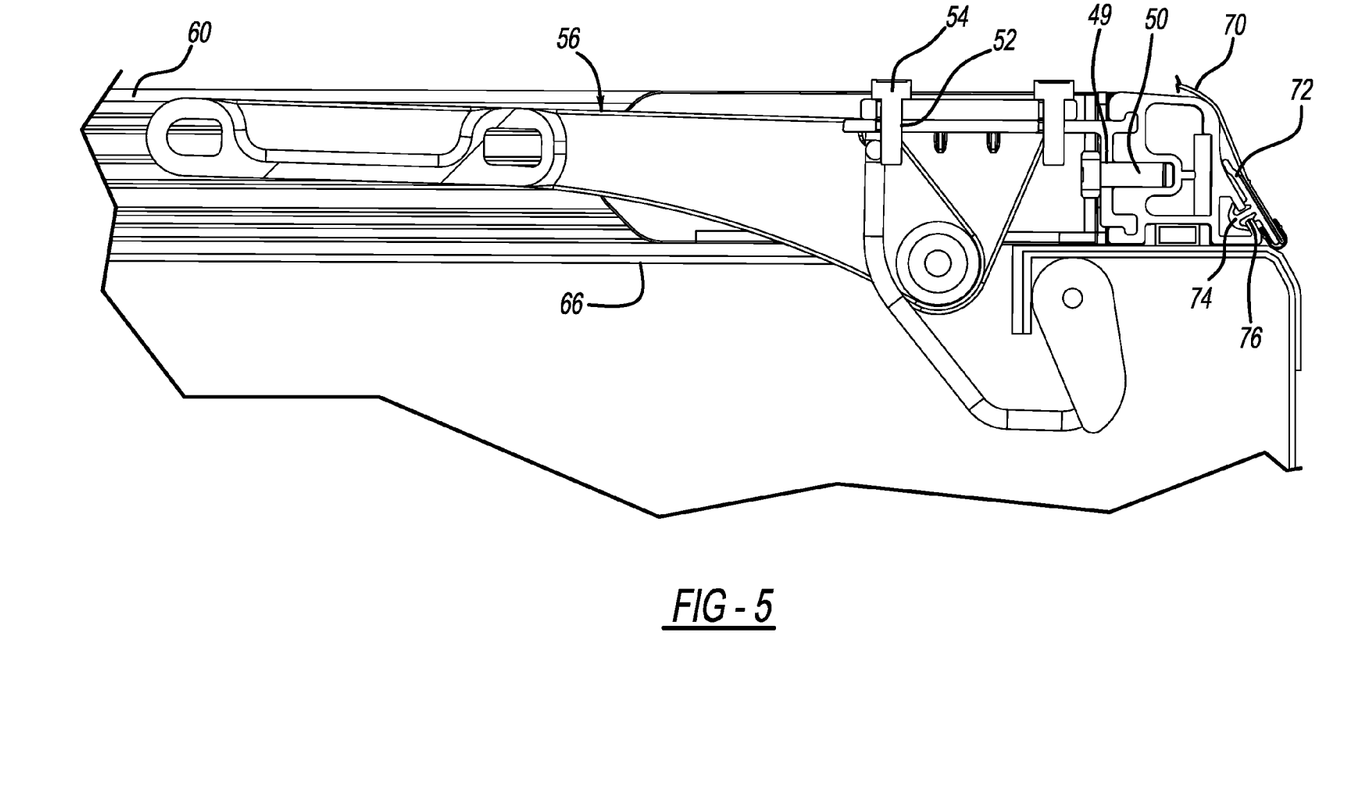
FIG. 5 is an enlarged cross-sectional view of the latch and bracket mounting and side rail arrangement of the embodiment of FIG. 1.
Figure 6:
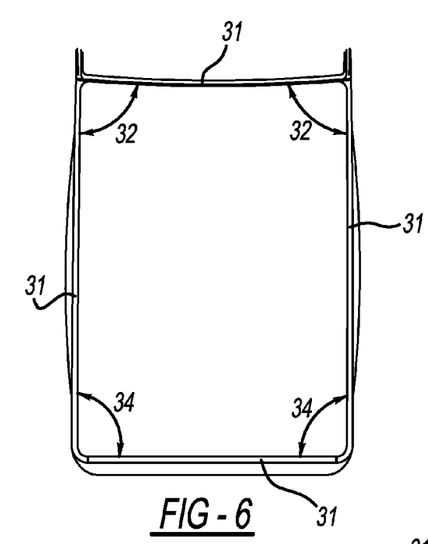
FIG. 6 is a schematic top plan view representation of a truck bed perimeter when the truck has a standard cab configuration.
Figure 7:
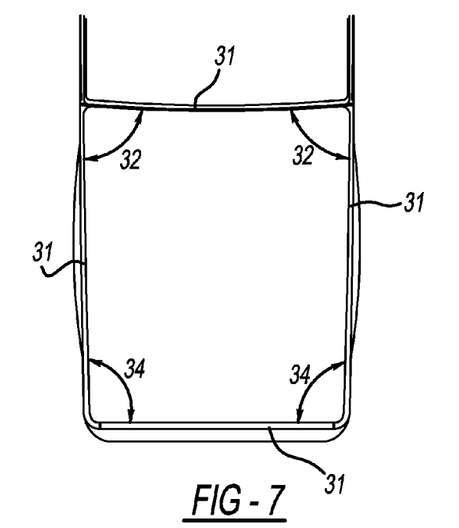
FIG. 7 is a schematic top plan view representation of a truck bed perimeter similar to FIG. 6 when the truck has an intermediate cab configuration.
Figure 8:
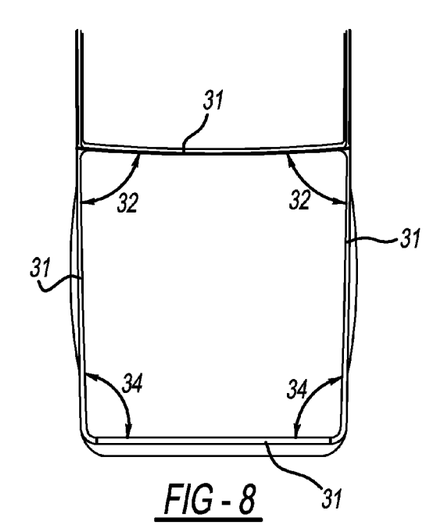
FIG. 8 is a schematic top plan view representation of a truck bed perimeter similar to FIG. 6 when the truck has an extended cab configuration.

One exemplary embodiment of a pickup truck tonneau cover 30 of the present disclosure is illustrated with reference to FIGS. 1-9. Pickup truck beds have a generally rectangular perimeter 31 (FIGS. 6-8). In some cases the perimeter has four 90 degree corners and is rectangular. In other cases, the generally rectangular shape is slightly trapezoidal in nature, with the two forward corners having an angle 32 slightly less than 90 degrees and the two rearward corners having an angle 34 that is slightly more than 90 degrees. Examples of this are illustrated in FIGS. 6-8, where FIG. 6 is a standard cab configuration, FIG. 8 is an extended cab configuration, and FIG. 7 is an intermediate cab configuration. The difference in these angles 32, 34 from 90 degrees is typically less than about 2 degrees, thereby maintaining the overall generally rectangular shape of the truck bed perimeter.

Figure 1:
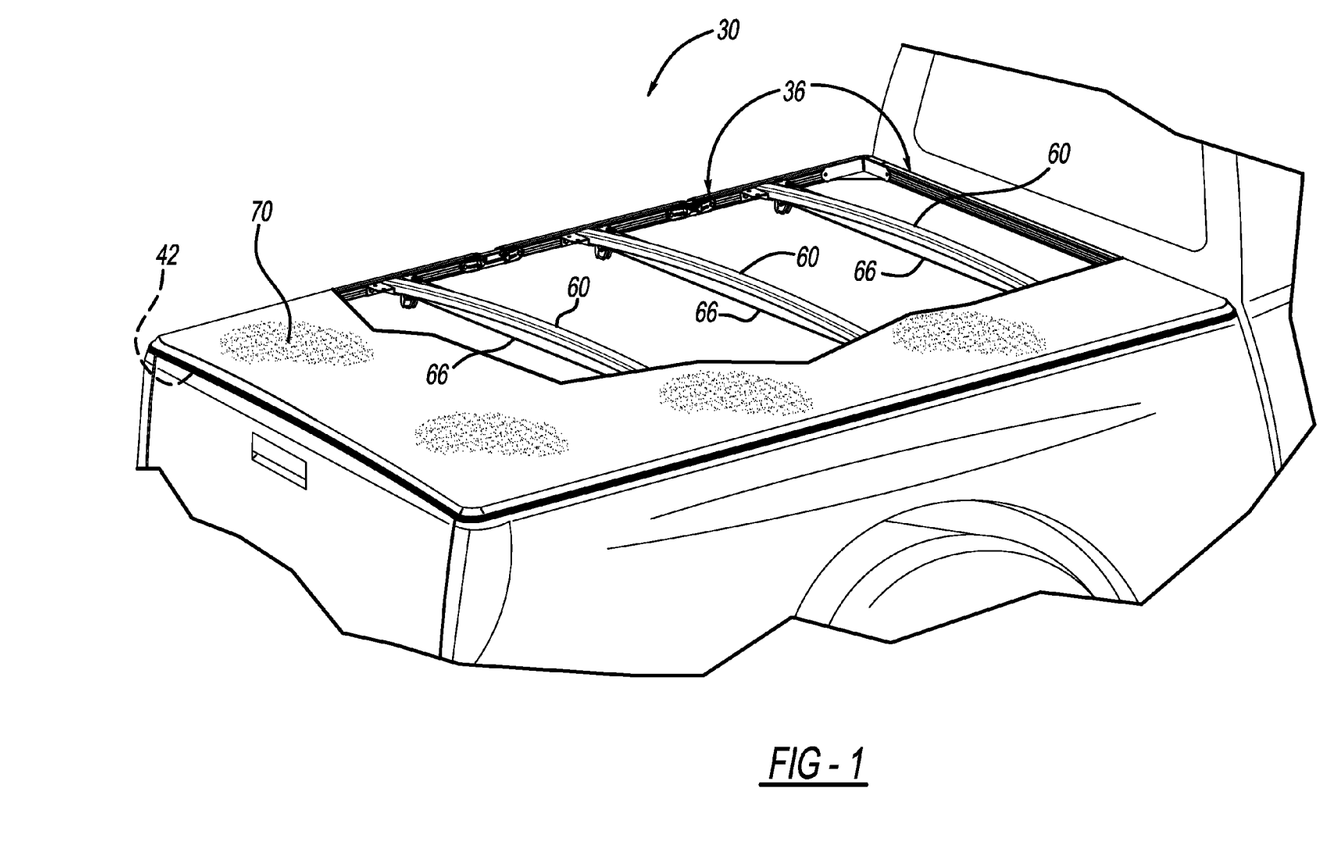
FIG. 1 is a partial perspective view of a pickup truck and a first embodiment of a pickup bed tonneau cover with a partial cut-away of the flexible textile covering.
Figure 2:
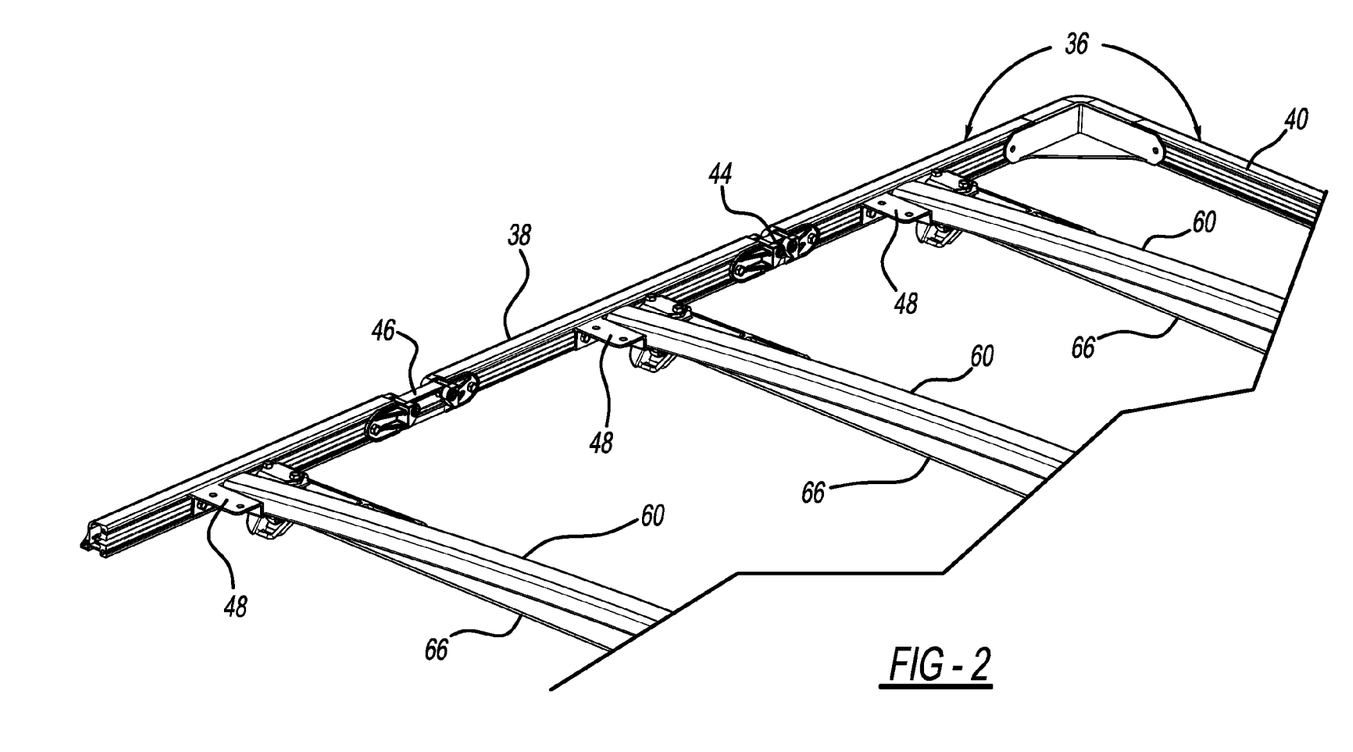
FIG. 2 is an enlarged partial perspective view of the pickup bed tonneau cover support structure of FIG. 1.

An outer frame 36 of tonneau cover 30 generally corresponds to the outer perimeter 31 of the pickup truck bed. Side rails 38 extend along the lateral sides of the truck bed. A front rail 40 and a rear rail 42 extend in the cross-car direction. Side rails 38 are coupled to and span between front rail 40 and rear rail 42. Each side rail 38 includes three sub-rails coupled together via two pairs of hinges 44, 46 that permit tonneau cover 30 to be manually folded in a tri-fold configuration.

Figure 3:
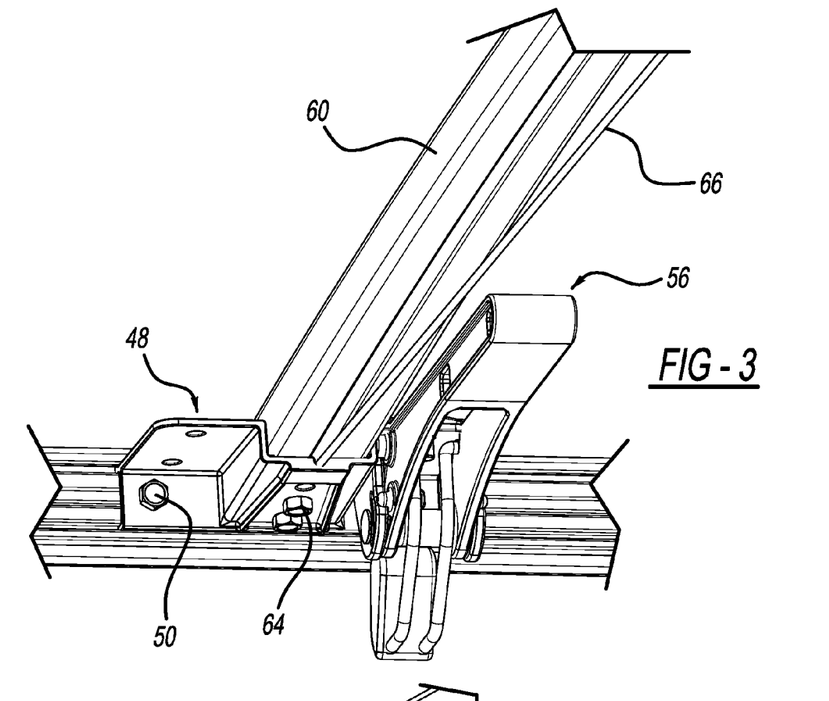
FIG. 3 are further enlarged partial perspective views of the pickup bed tonneau cover support structure of FIG. 1 viewing the upper side of a cross bar bracket and side rail member.

Intermediate cross-car rail brackets 48 are arranged in pairs that are coupled to opposing sides 38 of outer frame 36. A first of each pair of cross-car brackets 48 is coupled to one side rail or side frame member 38, and the second of each pair of cross-car brackets 48 is coupled to opposing side rail or side frame member 38. Brackets 48 include apertures 49 through which screws or bolts 50 extend and are threaded into cooperating threaded openings in the adjacent side rail member 38. Alternatively, the head of bolt 50 may be captured in a T-shaped channel of the side rail member and extend through an aperture 49 of bracket 48. Then, a nut can be threaded onto bolt 50 to secure bracket 48 to the side frame member 38.

Intermediate rail brackets 48 can have a metal die cast construction and a symmetrical configuration to permit the same bracket 48 to be positioned along either side of outer frame 36. Bracket 48 includes apertures 52 through which screws or bolts 54 can mount a latching mechanism 56 as desired. Brackets 48 also include a main recess 58 into which an end of an intermediate cross-car rail 60 is received. Main recess 58 includes apertures through which threaded screws or bolts 64 are provided to couple an end of an intermediate rail 60 to bracket 48. Bolts 64 are threaded into cooperating threaded apertures provided in the corresponding end of intermediate rail 60 along its bottom side.

Figure 9:
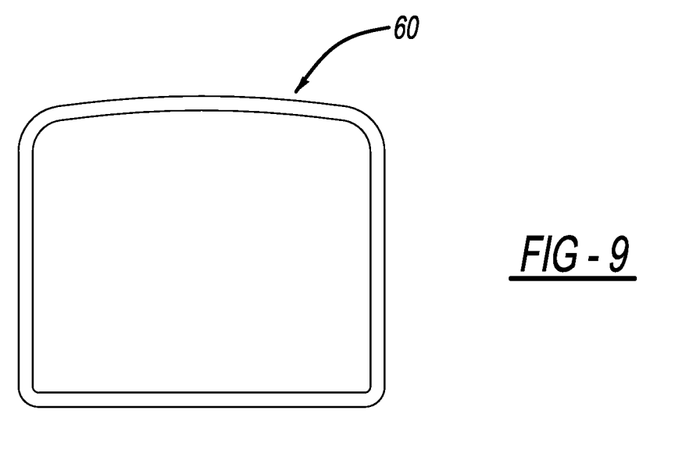
FIG. 9 is a cross-sectional view of the cross bar intermediate rail members.

Intermediate rails 60 span between and are coupled to the side rails 38 via each pair of intermediate rail brackets 48. One end of each intermediate rail 60 is coupled to the one of a pair of brackets 48. The opposing end of the intermediate rail 60 is coupled to the other of the pair of brackets 48. Each intermediate rail 60 has an upwardly bowed configuration along its length. In addition, the cross-section of the bowed intermediate rail 60 can have a curved upper surface and a flat bottom surface as illustrated in FIG. 9.

Intermediate bowed cross-car rails 60 and the outer frame 36 rail members (38, 40, 42) can have an extruded metal construction. In some cases, the metal from which bowed intermediate rails 60 are formed is preferably aluminum, or an aluminum metal alloy, such as AA6063-T5 aluminum alloy.

Along with each bowed, intermediate, cross-car rail 60, a corresponding tension member 66 also spans between and is coupled to the opposing side rails 38 via each pair of brackets 48. One end of each tension member 66 is coupled to the one of a pair of brackets 48. The opposing end of the tension member 66 is coupled to the other of the pair of cross-bar brackets 48.

Within main recess 58 of brackets 48 is a secondary recess 68 into which an end of a wire tension member 66 is received. Opposing distal ends of each wire tension member 66 includes an enlarged coupling member 71. Secondary recess 68 has a cooperating enlarged recess portion, which receives and retains the enlarged coupling member 71 to couple tension member 66 to bracket 48, and thereby, to adjacent side frame member 38 of outer frame 36.

Tension member 66 can be formed from music wire (ASTM A228), with enlarged coupling members 71 affixed at each distal end. Surprisingly, tension member 66 need not be pre-tensioned. Tension member 66 can simply be made to length and coupled to a corresponding pair of brackets 48. Tension member 66 reduces the displacement that occurs as a result of a downward force on the tonneau cover, allowing the use of more lightweight, flexible materials and less material for the bowed intermediate rails 60. Preferably, under a 15.6 pound per square foot downward loading, the lateral displacement of brackets 48 (resulting from displacement of a bowed intermediate member 60) is less than about 8 mm, more preferably, less than about 5 mm, even more preferably less than about 3 mm, and even more preferably, less than about 2 mm.

A flexible textile member 70 covers the intermediate cross-car rails 60 and outer frame 36 and is coupled thereto. Flexible textile 70 includes any materials having a desired resistance to abrasion, tearing, and external elements, such as a leather, a vinyl, or a polyvinyl chloride-coated (PVC) material. Flexible textile member 70 can be joined to a plastic coupling member 72 including a barb 74 that that couples with a cooperating slot 76 along the outside of side rails 38.

Also included in this disclosure are methods for manufacturing pickup truck tonneau covers. These methods should be apparent from the disclosure above. Such methods include providing a generally rectangular outer frame 36 with a configuration that substantially corresponds to a pickup truck bed perimeter 31. Providing the outer frame 36 can include providing an outer frame 36 having any of the features disclosed herein, including those of front 40 and rear 42 rails, side rails 38, hinges 44, 46, corner brackets, etc.

A plurality of elongated intermediate rails 60 are formed to have an upwardly bowed shape along a length of each intermediate rail 60. Forming these bowed intermediate rails 60 can involve using an extrusion molding process. Each of the plurality of bowed intermediate rails 60 are coupled at a first end to one side of the outer frame 36, and coupled at an opposing end to the opposing side of the outer frame 36.

Each bowed intermediate rail 60 is paired with a wire tension member 66, which is provided. Similar to the intermediate rails 60, each of the wire tension members 66 is coupled at a first end to one side of the outer frame 36, and coupled at an opposing end to the opposing side of the outer frame 36. Each wire tension member 66 is also coupled at a first end to a first end of the paired intermediate rail 60 and coupled at the opposing end to the opposing end of the paired intermediate rail 60. Wire tension members 66 operate to help maintain the bowed shape of the intermediate rail 60 to which it is paired when a downward force is applied to the bowed intermediate member 60.

Coupling the ends of the bowed intermediate rails 60, the ends of the wire tension member 66, or both, can include interposing a provided bracket 48 between the ends of the bowed intermediate rails 60 and side rails 38 of outer frame 36. Bracket 48 can be provided with any of the bracket 48 and joining features disclosed herein. Alternatively or additionally, the ends of the bowed intermediate rails 60 and wire tension members 66 can be coupled directly to each other (e.g., by welding, bolting, or other suitable means) regardless of whether a bracket is also used.

A flexible textile member 70 is positioned over the outer frame 36 and bowed intermediate rails 60 and coupled to the outer frame 36. Such coupling can include providing and using any of the applicable coupling features disclosed herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in alternative embodiments, even if not specifically shown or described. The same may also be varied in many ways. Such variations are not to be regarded as a departure from the disclosure, and all such modifications are intended to be included within the scope of the disclosure.

The invention claimed is:

1. A pickup truck bed tonneau cover comprising:
   an outer frame comprising a front frame member, a rear frame member, a side frame member and an opposing side frame member, the outer frame being configured to substantially correspond to a perimeter of the pickup truck bed;
   a pair of intermediate rail brackets coupled to opposing sides of the outer frame so that a first of the pair of intermediate rail brackets is coupled to one side frame member and a second of the pair of intermediate rail brackets is coupled to an opposing side frame member;
   an intermediate rail member spanning between, and coupled to, the pair of intermediate rail brackets so that each end of the intermediate rail member is coupled to one of the pair of intermediate rail brackets, the intermediate rail member being bowed upwardly along an elongated length of the intermediate rail member;
   a wire tension member spanning between each end of the intermediate rail member; and
   a flexible textile member covering and supported by the intermediate rail member, the flexible textile member being coupled to the outer frame.

2. The pickup truck tonneau cover according to claim 1, wherein the wire tension member is configured to restrict displacement of the bowed intermediate rail to less than about 1.5 mm under a downward force acting on the tonneau cover of 15.6 pounds per square foot.

3. The pickup truck tonneau cover according to claim 1, wherein each intermediate rail bracket comprises a main recess configured to receive an end of the intermediate rail member for coupling.

4. The pickup truck tonneau cover according to claim 1, wherein the wire tension member comprises an enlarged coupling member at each distal end, and wherein each of the pair of intermediate rail brackets includes a cooperating recess to receive the enlarged coupling member at one distal end to couple the wire tension member to the intermediate rail bracket.

5. The pickup truck tonneau cover according to claim 1, wherein the intermediate rail member is made from a material selected from the group consisting of aluminum and aluminum alloys.

6. The pickup truck tonneau cover according to claim 1, further comprising a hinge coupled to the side frame member paired with an opposing hinge coupled to the opposing side frame member.

7. The pickup truck tonneau cover according to claim 1, further comprising a first latch coupled to a first of the pair of intermediate rail brackets, and a second latch coupled to a second of the pair of intermediate rail brackets.

8. A pickup truck bed tonneau cover comprising:
   an outer frame comprising a front frame member, a rear frame member, a side frame member and an opposing side frame member, the outer frame being configured to substantially correspond to a perimeter of the pickup truck bed;
   a pair of intermediate rail brackets coupled to opposing sides of the outer frame so that a first of the pair of intermediate rail brackets is coupled to one side frame member and a second of the pair of intermediate rail brackets is coupled to an opposing side frame member;
   an intermediate rail member spanning between, and coupled to, the pair of intermediate rail brackets so that each end of the intermediate rail member is coupled to one of the pair of intermediate rail brackets, the intermediate rail member being bowed upwardly along an elongated length of the intermediate rail member; and
   a wire tension member spanning between each end of the intermediate rail member, the wire tension member being coupled to the intermediate rail brackets adjacent each end of the intermediate rail member;
   wherein each intermediate rail bracket comprises a main recess configured to receive an end of the intermediate rail member for coupling, and wherein the wire tension member comprises an enlarged coupling member at each distal end, and wherein the main recess includes a cooperating recess to receive the enlarged coupling member at one distal end to couple the wire tension member to the intermediate rail bracket.

9. The pickup truck tonneau cover according to claim 8, wherein the wire tension member is configured to restrict the lateral displacement of the bowed intermediate rail to less than about 1.5 mm under a downward force acting on the tonneau cover of 15.6 pounds per square foot.

10. The pickup truck tonneau cover according to claim 8, wherein the intermediate rail member is made from a material selected from the group consisting of aluminum and aluminum alloys.

11. The pickup truck tonneau cover according to claim 8, further comprising a hinge coupled to the side frame member paired with an opposing hinge coupled to the opposing side frame member.

12. The pickup truck tonneau cover according to claim 8, further comprising a first latch coupled to a first of the pair of intermediate rail brackets, and a second latch couplet to a second of the pair of intermediate rail brackets.

13. A method of manufacturing a pickup truck bed tonneau cover comprising:
   providing a generally rectangular outer frame with a configuration that substantially corresponds to a pickup truck bed perimeter;
   forming a plurality of elongated intermediate rails to have an upwardly bowed shape along a length of each intermediate rail;
   coupling a first end of each bowed intermediate rail to one side of the outer frame;
   coupling an opposing end of each bowed intermediate rail to an opposing side of the outer frame;
   coupling a first end of a wire tension member adjacent to the first end of each bowed intermediate rail;
   coupling an opposing end of the wire tension member adjacent to the opposing end of each bowed intermediate rail;
   positioning a flexible textile member over the outer frame and bowed intermediate rails; and
   coupling the flexible textile member to the outer frame.

14. The method of manufacturing a pickup truck bed tonneau cover according to claim 13, wherein the coupling the first end of each bowed intermediate rail to one side of the outer frame comprises coupling the first end of each bowed intermediate rail to a first intermediate rail bracket and coupling the first intermediate rail bracket to the one side of the outer frame, and wherein the coupling the opposing end of each bowed intermediate rail to the opposing side of the outer frame comprises coupling the opposing end of each bowed intermediate rail to an opposing intermediate rail bracket and coupling the opposing intermediate rail bracket to the opposing side of the outer frame.

15. The method of manufacturing a pickup truck bed tonneau cover according to claim 14, further comprising providing each intermediate rail bracket with a main recess configured to receive an end of the intermediate rail member.

16. The method of manufacturing a pickup truck bed tonneau cover according to claim 13, wherein the coupling the first end of the wire tension member adjacent to the first end of each bowed intermediate rail comprises coupling the first end of the wire tension member to a first intermediate rail bracket and coupling the first intermediate rail bracket to the first end of each bowed intermediate rail, and wherein the coupling the opposing end of the wire tension member adjacent to the opposing end of each bowed intermediate rail comprises coupling the opposing end of the wire tension member to an opposing intermediate rail bracket and coupling the opposing intermediate rail bracket to the opposing end of each bowed intermediate rail.

17. The method of manufacturing a pickup truck bed tonneau cover according to claim 16, further comprising providing the wire tension member with an enlarged coupling member at each distal end, and providing the intermediate rail bracket with a cooperating recess to receive the enlarged coupling member at one distal end to couple the end of the wire tension member to the intermediate rail bracket.

18. The method of manufacturing a pickup truck bed tonneau cover according to claim 16, further comprising coupling a first latch to the first intermediate rail bracket and a second latch to the second intermediate bracket.

19. The method of manufacturing a pickup truck bed tonneau cover according to claim 13, further comprising providing the outer frame with two sets of hinges configured to allow the tonneau cover to be manually folded into a tri-fold configuration.

20. The method of manufacturing a pickup truck bed tonneau cover according to claim 13, further comprising selecting the material from which to form the plurality of elongated intermediate rails from the group consisting of aluminum and aluminum alloys.

* * * * *

UNITED STATES PATENT AND TRADEMARK OFFICE
CERTIFICATE OF CORRECTION

PATENT NO. : 8,657,358 B2  Page 1 of 1
APPLICATION NO. : 13/538261
DATED : February 25, 2014
INVENTOR(S) : Bradley R. Garska It is certified that error appears in the above-identified patent and that said Letters Patent is hereby corrected as shown below:

In the Specification:

Issued Patent                             Description of Error

| Column | Line | |
|---|---|---|
| Column 2 | Line 32 | Delete "are" and insert --is a--, therefor |
| Column 2 | Line 32 | Delete "views" and insert --view--, therefor |
| Column 2 | Line 35 | After "perspective", insert --view--, therefor |
| Column 2 | Line 51 | Delete "members;" and insert --members.--, therefor |
| Column 4 | Line 19 | After "74", delete duplicate "that" |

In the Claims:

| Column 6 Claim 12 | Line 37 | In Claim 12, delete "couplet" and insert --coupled--, therefor |
|---|---|---|

Signed and Sealed this
Eighth Day of July, 2014

Michelle K. Lee
*Deputy Director of the United States Patent and Trademark Office*